June 18, 1957    L. GLICKMAN    2,796,124
SHEARING MACHINE

Filed Nov. 22, 1954    3 Sheets-Sheet 1

INVENTOR.
LEONARD GLICKMAN
BY
Salvatore G. Militana
ATTORNEY

June 18, 1957 — L. GLICKMAN — 2,796,124
SHEARING MACHINE
Filed Nov. 22, 1954 — 3 Sheets-Sheet 2
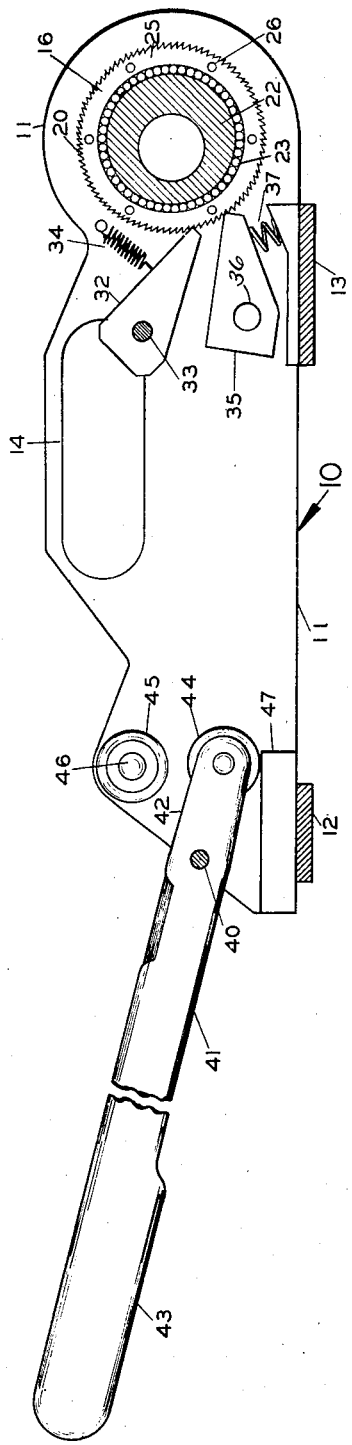
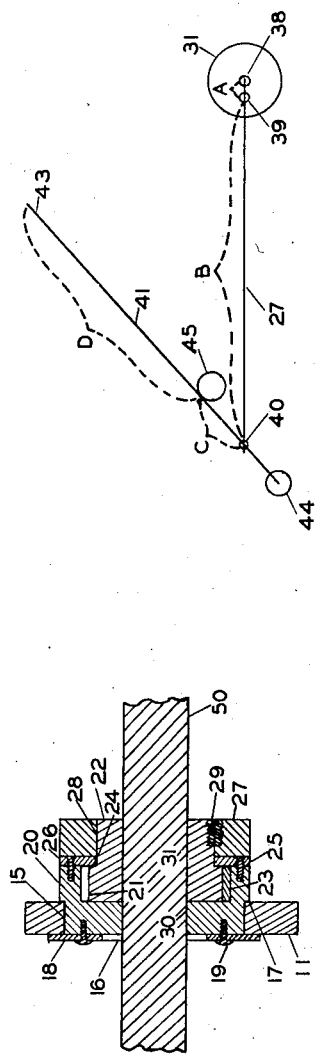
INVENTOR.
LEONARD GLICKMAN
BY
Salvatore G. Militano
ATTORNEY June 18, 1957 L. GLICKMAN 2,796,124
SHEARING MACHINE
Filed Nov. 22, 1954 3 Sheets-Sheet 3
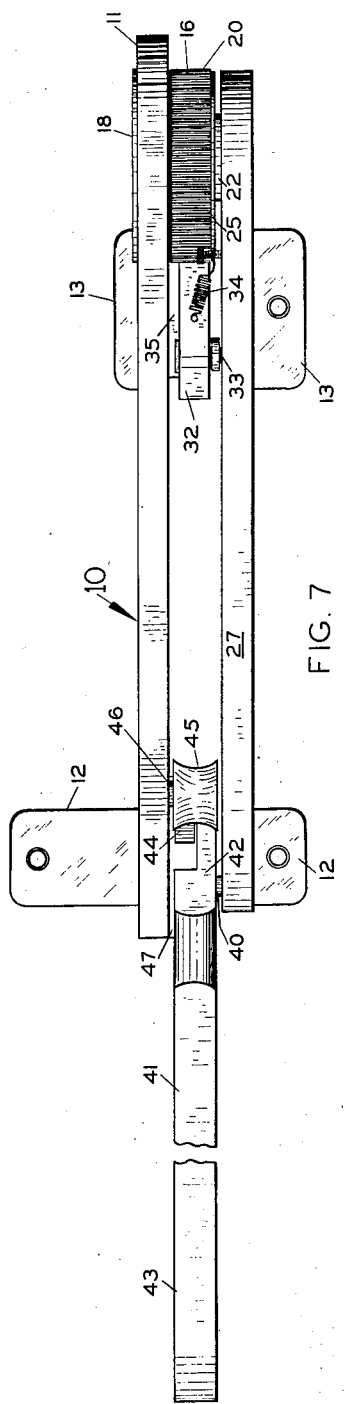
INVENTOR.
LEONARD GLICKMAN
BY
ATTORNEY 本
United States Patent Office 2,796,124
Patented June 18, 1957

2,796,124

SHEARING MACHINE

Leonard Glickman, Miami Beach, Fla.

Application November 22, 1954, Serial No. 470,359

7 Claims. (Cl. 164—40)

This invention relates generally to cutting devices and is more particularly directed to shearing machines.

A principal object of the present invention is to provide a shearing device which has a high mechanical advantage, thereby making it possible to utilize the ordinary strength or forces of an individual to shear objects heretofore requiring tremendous mechanical power.

A further object of the present invention is to provide a shearing device of high mechanical advantage which is small in size, light in weight and economical in cost.

A further object of the present invention is the provision of a portable shearing device characterized as above that will shear or cut articles without leaving burrs along the sheared edge portion.

A further object of the present invention is to provide a shearing device of the above character wherein cutter disks may be provided with openings of various sizes so as to accommodate articles of different sizes.

The invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 3 is a sectional view taken along the line 3—3 of Figure 1 with the operating lever in its extended position.

Figure 4 is a cross sectional view taken along the line 4—4 of Figure 2.

Figure 6 is a schematic moment or force diagram of the shearing machine.

Figure 7 is a top plan view of my shearing machine shown with its operating lever in the extended position.

Figure 1:
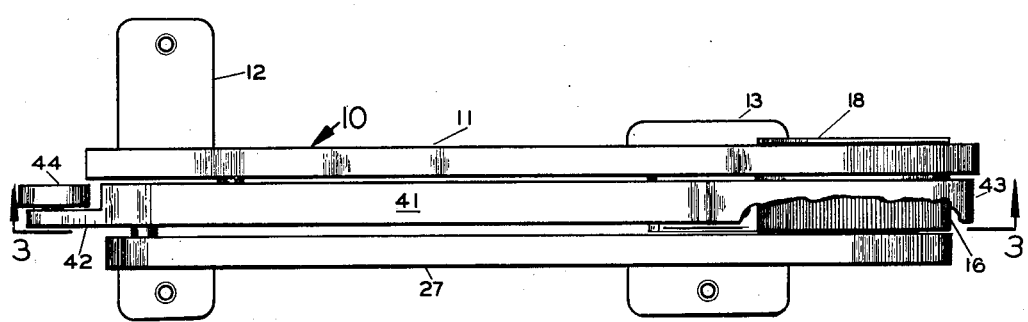
Figure 1 is a top plan view partially broken away of a shearing machine embodying my invention.

Referring to the drawings wherein like numerals are used to designate similar parts throughout the several views, the numeral 10 refers to a shearing device consisting of a stationary frame or standard 11 with base plates 12 and 13 for supporting the standard 11 in an upright position. The standard 11 is provided with a cut out portion 14 as a handle for carrying purposes. At the forward end of the frame 11 there is a bore 15 in which is positioned a main cutter disk 16 provided with an annular shoulder 17 which abuts against the frame 11 when the main cutter disk 16 is in position. An annular plate 18 secured to the face of the cutter disk 16 by screws or bolts 19 abuts against the frame 11 to secure the cutter disk 16 in the bore 15 against lateral movement thereof, but permits rotational movement of the main cutter disk 16. The outer portion of the main cutter disk 16 is provided with a plurality of teeth 20 to form a ratchet. An annular recess 21 is formed at the inner portion of the main cutter disk 16 and adapted to receive one end of a companion cutter disk 22. Means is provided to reduce the friction effected by the relative rotational movements of the main cutter disk 16 and the companion cutter disk 22 comprising roller bearings 23 interposed therebetween in the rcess 21. The companion cutter disk 22 is provided with an annular shoulder 24 against which an annular plate 25 abuts, the latter being secured to the outer edge portion of the main cutter disk 16 by screws 26. A lever arm 27 extending alongside the standard 11 has a bore 28 about which the lever arm 27 pivots, and which bore 28 is received by the outer portion of the companion cutter disk 22 and secured thereon by set screws 29. The main cutter disk 16 and the companion cutter disk are provided with eccentrically positioned bores 30 and 31 respectively, of equal size whose centers 38 are equally distant from the pivotol axis 39 of the lever arm 27, and whose function is described in greater detail hereinafter.

Since the main cutter disk 16 and the companion cutter disk 22 are relatively rotatable, means are provided to effect unison rotation of the disks 16 and 22 during a portion of the swinging movement of the lever arm 27 comprising a pawl 32 pivoted as at 33 on the inner wall of the lever arm 27 with the free end of the pawl 32 engaging the teeth 20 of the movable cutter disk 16 and a coil spring 34 yieldingly urging the pawl 32 into engagement with the teeth 20. To prevent the reverse rotational movement of the main cutter disk 16, a second pawl 35 which is pivoted as at 36 to the inner side wall of the standard 11 has its free end engaging the teeth 20. A compression spring 37 urges the pawl 35 into engagement with the teeth 20. The pawl 35 is so positioned that it permits the rotation of the main cutter disk 16 only in a counter-clockwise direction as viewed in Figures 2 and 3, while the pawl 32 effects the rotation of the main cutter disk 16 only when the lever arm 27 is swinging in a counter-clockwise direction.

In the operation of the shear device 10 of that structure thus far described, an operator grasps the free end of the lever arm 27 and raises it causing the latter to swing about its axis in a clockwise direction. The companion cutter disk 22 rotates with the lever arm 27 in a clockwise direction, since they are secured together by the set screws 29.

Figure 2:
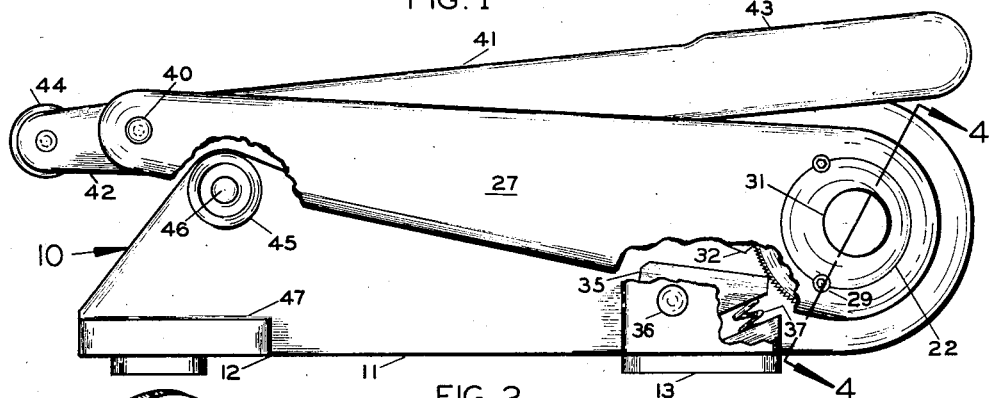
Figure 2 is a side elevational view thereof.
Figure 5:
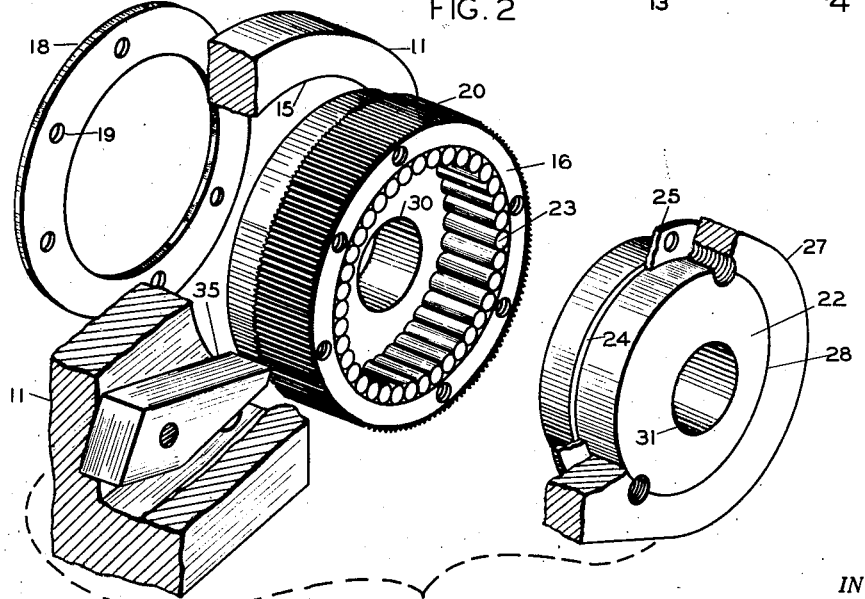
Figure 5 is a detailed exploded view of the shearing mechanism with the standard and lever arm shown in section.

The pawl 35 prevents the main cutter disk 16 from rotating while the pawl 32 pivotally secured to the lever arm 27 swings with the arm 27 while riding freely over the teeth 20 of the main cutter disk 16. The operator continues swinging the lever arm 27 as aforesaid until the bores 30 and 31 of the cutter disks 16 and 22 are in alignment. The lever arm 27 is now swung in a counter-clockwise direction to its original position as shown by Figure 2 to commence the shearing action. During this swinging movement the pawl 32 engages one of the teeth 20 of the main cutter disk 16 and compels the latter to rotate in unison with the companion cutter disk 22 while the pawl 35 rides freely on the teeth 20. With the bores 30 and 31 in alignment, the operator inserts therethrough any object he wishes to shear or cut, such as a steel bar 50 shown in position by Figure 4. Now when the operator forces the free end of the lever arm upwardly, the companion cutter disk 22 will rotate clockwise, while the main cutter disk 16 is made to retain stationary by the pawl 35. Since the bores 30 and 31 are not concentric with the pivotal axis of the lever arm 27, the bores 30 and 31 will move out of alignment with each other by an amount determined by the eccentricity of the bores 30 and 31 with respect to the pivotal axis of the lever arm 27 and by the length of the arc through which the lever arm 27 is swung. As can be readily seen, the shearing action commences upon the movement of the bores 30 and 31 out of axial alignment with each other. Repeated swinging movements of the lever arm 27 will cause a sufficient displacement of the bore 31 from its alignment position with the bore 30 to shear the steel rod 50 completely.

In Figure 6 there is shown a moment diagram of the shear device 10. The distance between the pivotal axis 39 of the lever arm 27 and the axes 38 of the bores 30 and 31 is represented by A while the length of the lever arm 27 to its pivotal axis is represented by B. The moment therefore, is B divided by A. For example if A is equal to one-eighth of an inch and B is equal to twenty-four inches the mechanical advantage will be 192. In other words, upon the application of an upward force of one pound at the free end of the lever arm 27, a shearing force of 192 pounds will be effected by the cutting disks 16 and 22. This of course, would be insufficient to shear large objects made of steel, etc.

There are many ways by which the mechanical advantage of the shearing device 10 may be increased. As shown by the drawings, on the free end of the lever arm 27 there is secured a pivot pin 40 on which is pivotally mounted an operating lever 41 at a position adjacent one end 42 while the other end 43 is formed into a handle for gripping by an operator. At the end portion 42 of the operating lever 41 there is mounted a roller 44 which extends beyond the end 42. Another roller 45 is rotatably mounted on a pin 46 secured to the inner wall of the standard 11 above the base 12 and in close proximity to the end portion of the lever arm 27. A roller track 47 is mounted on the base 12 in vertical alignment with the operating lever 41 and rollers 44 and 45. Now when operating the device 10, the handle 43 is grasped and swung in a counter-clockwise direction about its pivot pin 40 until it arrives at approximately a vertical position when the operating lever 41 is lifted upwardly and made to describe an arc. This causes the free end of the lever arm 27 to swing in a clockwise direction until the bores 30 and 31 are positioned in alignment with each other as previously described. Then the operating lever 41 is caused to be swung through an arc in a counter-clockwise direction until the operating lever 41 returns to its vertical position and the roller 44 rests on the track 47. The operating lever 41 is pivoted in a counter-clockwise direction about its pivot pin 40 causing the lever arm 27 to pivot about its axis in a counter-clockwise direction until the lever arm 27 is approximately horizontal and in its extreme position, and the operating lever 41 is in horizontal alignment therewith and resting on the roller track 47. With the bores 30 and 31 in alignment, the steel bar 50 is placed therein to be sheared. The operator exerts an upward force on the handle 43 causing the operating lever 41 to pivot about its pivot pin 40 in a clockwise direction and the roller 44 to ride to the left, as seen in Figure 3. At the same time the lever arm 27 is caused to be swung a relatively short distance about its pivotal axis in a clockwise direction until the operating lever 41 comes into contact with the roller 45. The roller 45 now acts as a fulcrum. A further force exerted on the handle 43 causes the end 42 of the operating lever 41 to swing upwardly carrying the pivot pin 40 and causing the free end of the lever arm 27 to swing in a clockwise direction. As the latter swings, the companion cutter disk 22 is rotated while the main cutter disk 16 is held against rotation by the pawl 35 thereby moving the companion cutter disk 22 out of alignment with the main cutter disk 16 and commencing the shearing action on the steel rod 50. The operator now lifts the handle 43 and swings it in a counter-clockwise direction. When the operating lever 41 has swung past a vertical position, the lever arm 27 begins to swing about its pivotal axis in a counter-clockwise direction and the pawl 32 which previously engaged a tooth 29 causes the main cutter disk 16 to rotate in unison with the companion cutter disk 22. The operation of the operating lever 41, as described above is repeated until the bore 31 has swung to a certain degree out of alignment with the bore 30 when the steel bar 50 becomes completely severed. As seen in Figure 6, the mechanical advantage of the operating lever 41 is equal to D divided by C where D equals the distance from the roller 45 which acts as a fulcrum to the end of handle 43 and C is the distance from the fulcrum or roller 45 to the pivot pin 40 of the lever arm 27. For example, if C is one inch long and D is thirty inches long, the mechanical advantage of the operating lever itself is 30. Now, the mechanical advantage of the shearing device 10 utilizing the operating lever 41 will be B times D divided by A times C. In the example given the mechanical advantage of the entire shearing device 10 will be 5760. In other words, a pound force on the handle 43 will effect a shearing force of 5760 pounds at the bores 30 and 31 and upon the application of normal forces available to an individual, sufficient shearing forces will be effected by the main and companion cutter disks 16 and 22 to shear mild steel having a cross-section of more than 10 square inches.

The bores 30 and 31 may have any configuration or size desired depending upon the cross section shape and size of the article being sheared. For example, if the article being cut is hexagonal in shape, the bores 30 and 31 would have a hexagonal cross section. There may be a plurality of bores of different sizes in the cutter disks 16 and 22. Also, the shearing device 10 may be utilized to shear any materials such as metals, plastics, wood, etc., that require a great deal of force yet be sheared evenly and without distorting the article being sheared.

Having now disclosed my invention and realizing that in view of my disclosure many other modifications in details and construction or design will readily occur to those skilled in the art, I do not choose to limit myself except as in the appended claims.

What I claim as new is:

1. A device of the class described comprising a first shearing means having a circular slot, a second shearing means mounted in said circular slot, bearing means mounted about said circular slot between said first and second shearing means, said first and second shearing means having an eccentric opening in alignment with each other and means for rotating one of said shearing means relative to said other shearing means whereby said openings move out of alignment with each other.

2. A device of the class described comprising a first disk, said first disk having a circular slot, a support mounting said first disk, a second disk mounted in said circular slot in axial alignment with said first disk, each of said disks having an eccentrically disposed opening, said openings being in alignment with each other, and means for rotating one of said disks whereby one of said openings moves out of alignment with the other of said openings.

3. A device of the class described comprising a support, a main cutter disk rotatably mounted on said support, said main cutter disk having a concentrically disposed circular slot and an eccentrically disposed opening, a companion cutter disk rotatably mounted in said circular slot of said main cutter disk, said companion cutter disk having an opening in axial alignment with said first named opening, means for rotating one of said disks relative to the other of said disks, and further means operatively connected to said other disk for effecting a unitary rotational movement of said main cutter disk and said companion cutter disk.

4. A device of the class described comprising a support, a main cutter disk, means mounting said main cutter disk on said support for rotational movement in one direction, said main cutter disk having a circular slot and an eccentrically disposed opening, a companion cutter disk rotatably mounted in said circular slot of said main cutter disk, said companion cutter disk having an eccentrically disposed opening in axial alignment with said first named opening, an operating member secured to said companion cutter disk for rotating said companion cutter disk, means mounted on said operating member and engaging said main cutter disk for unitary rotational movement of said main and said companion cutter disks in said one direction and further means engaging said companion disk for rotating said companion disk relative to said main cutter disk in said other direction.

5. A device of the class described comprising a support, a main cutter disk rotatably mounted on said support, said main cutter disk having an eccentrically disposed opening, a companion cutter disk rotatably mounted adjacent said main cutter disk, said companion cutter disk having an eccentrically disposed opening in axial alignment with said first named opening, an operating member secured to said companion cutter disk for rotating said companion cutter disk, means mounted on said operating member and engaging said main cutter disk for unitary rotational movement of said main and said companion cutter disks in one direction, and further means mounted on said support and engaging said main cutter disk for preventing the reverse rotational movement of said main cutter disk.

6. A device of the class described comprising a support, said support having a bore at one end, a main cutter disk rotatably mounted in said bore, said main cutter disk having a portion extending beyond said support, ratchet means mounted on said support and engaging said portion of said main cutter disk to prevent rotational movement of said main cutter disk in one direction, said cutter disk having an eccentrically positioned opening, a companion cutter disk rotatably mounted on said main cutter disk, said companion cutter disk having an opening in alignment with said opening on said main cutter disk, means mounted on said main cutter disk to prevent lateral displacement of said companion cutter disk, a lever arm secured at one end to said companion cutter disk for rotating said companion cutter disk and ratchet means mounted on said lever arm and engaging said portion of said main cutter disk to effect a unitary rotational movement of said main cutter disk and said companion cutter disk in the other direction.

7. A device of the class described comprising a support, said support having a bore at one end, a main cutter disk rotatably mounted in said bore, said main cutter disk having a portion extending beyond said support, ratchet means mounted on said support and engaging said portion of said main cutter disk to prevent rotational movement of said main cutter disk in one direction, said cutter disk having an eccentrically positioned opening, a companion cutter disk rotatably mounted on said main cutter disk, said companion cutter disk having an opening in alignment with said opening on said main cutter disk, means mounted on said main cutter disk to prevent lateral displacement of said companion cutter disk, a lever arm secured at one end to said companion cutter disk for rotating said companion cutter disk, ratchet means mounted on said lever arm and engaging said portion of said main cutter disk to effect a unitary rotational movement of said main cutter disk and said companion cutter disk in the other direction and an operating lever having a handle at one end, means pivotally mounting the other end of said lever arm to said operating lever in proximity to the other end thereof, a roller mounted on the other end of said operation lever and a fulcrum mounted on said support adapted to engage said operating lever between said handle and said pivot means.

References Cited in the file of this patent

UNITED STATES PATENTS

| 146,846 | Stevens | Jan. 27, 1874 |
| 2,638,985 | Ross | May 19, 1953 |

FOREIGN PATENTS

| 16,224 | Great Britain | of 1908 |